Jan. 18, 1944.                    J. G. INGRES                    2,339,701
                            CLUTCH CONTROL MECHANISM
                              Filed Feb. 18, 1941                 2 Sheets-Sheet 1
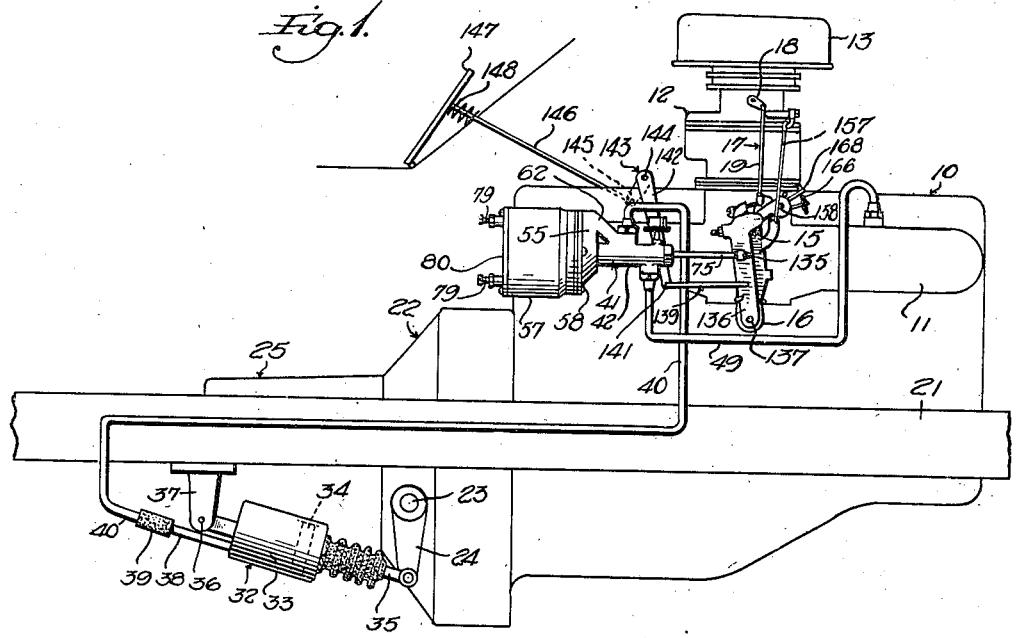
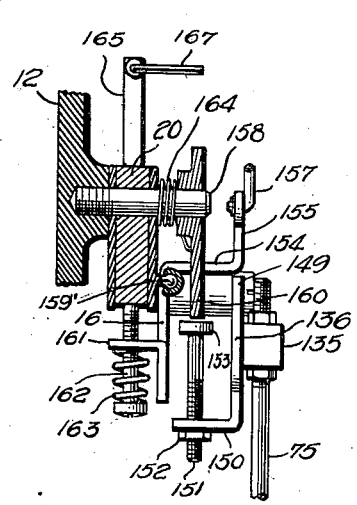
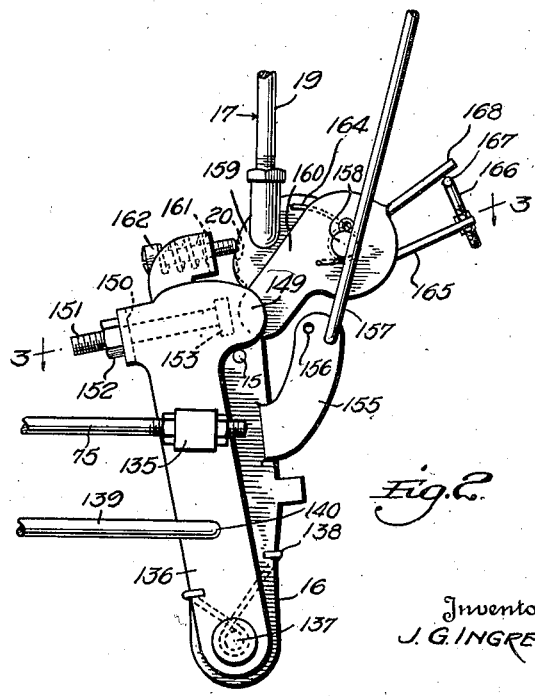
Inventor
J. G. INGRES
By
Attorney Jan. 18, 1944. J. G. INGRES 2,339,701
CLUTCH CONTROL MECHANISM
Filed Feb. 18, 1941 2 Sheets-Sheet 2
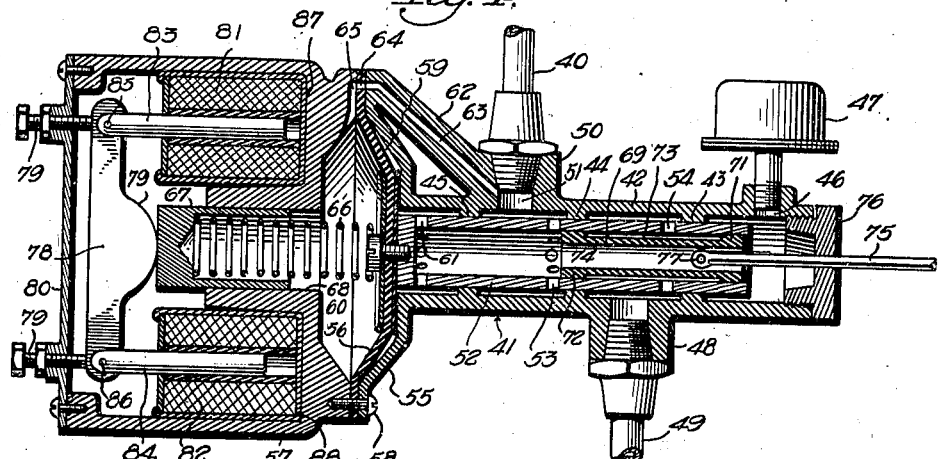
Inventor
J. G. INGRES Patented Jan. 18, 1944

2,339,701

UNITED STATES PATENT OFFICE 2,339,701

CLUTCH CONTROL MECHANISM

Jeannot G. Ingres, Detroit, Mich., assignor to Hill Engineering Corporation, Richmond, Va., a corporation of Virginia Application February 18, 1941, Serial No. 379,517

37 Claims. (Cl. 192—.01)

This invention relates to clutch control mechanisms for motor vehicles and is an improvement over the prior patent of Edward G. Hill, No. 1,964,693, granted June 26, 1934.

In the prior patent referred to a mechanism is provided for utilizing a differential fluid pressure motor for disengaging the vehicle clutch, and a novel type of follow-up control valve mechanism controls the operation of the motor. This valve mechanism is operated by the accelerator pedal of the vehicle whereby clutch disengagement takes place upon the releasing of the pedal, the valve mechanism being controlled by downward movement of the accelerator pedal and by fluid pressures in the fluid pressure operated motor in such a manner as to provide for a controlled return movement of the clutch elements into engagement to prevent the jerking and lunging of the vehicle.

Such prior mechanism was found to be highly efficient in operation and provided for the smoothest possible clutch engagement that could be obtained without the use of auxiliary devices for varying the operation of the mechanism under different conditions so as to provide different rates of clutch engagement in accordance with the particular conditions. For example, the prior mechanism referred to, without auxiliary control devices, and with the use of reasonable skill by the operator, would permit very smooth clutch engagement for all four gear positions of a conventional gear set. However, an unskilled operator might depress the accelerator pedal too rapidly to provide correspondingly too rapid clutch engagement when a vehicle was in low or reverse gears, or even in second gear. Moreover, the prior mechanism did not provide sufficiently slow engagement when the vehicle motor was first started when cold, and it did not provide for a shift down from high to second gear, which operation requires substantial acceleration of the vehicle engine prior to clutch engagement.

In the copending application of Edward G. Hill and Henry W. Hey, Serial No. 369,498, filed December 10, 1940, there is disclosed a clutch control mechanism employing the valve mechanism of the prior patent referred to supplemented by novel auxiliary control devices automatically operative for providing slow clutch engagement when the vehicle motor is cold, and for providing a somewhat lagging clutch engagement when the gear set is in first or reverse gears, thus preventing any possibility of stalling the motor due to too rapid engagement of the clutch elements.

In the copending application of Edward G. Hill and Henry W. Hey, Serial No. 372,410, filed December 30, 1940 (now Patent No. 2,320,182, granted May 25, 1943), there is shown a novel clutch control system employing the valve mechanism of the prior patent referred to, combined with an auxiliary control mechanism which functions automatically when a shift is made from high to second gear for permitting the engine to be accelerated to a substantial extent prior to clutch engagement, to thus fairly closely synchronize the speed of the clutch elements to prevent the lunging of the vehicle.

An important object of the present invention is to provide a novel clutch control mechanism for motor vehicles wherein a novel type of control mechanism is employed for insuring different modes of clutch engagement in accordance with varying conditions of operation.

A further object is to provide a clutch control mechanism employing a differential fluid pressure operated motor controlled by a follow-up valve mechanism one element of which is operated by the accelerator pedal and the other element of which is controlled in its follow-up action to provide different modes of clutch engagement in accordance with particular conditions.

A further object is to provide a clutch control mechanism including a follow-up control valve mechanism of the type shown in the prior patent referred to, in combination with auxiliary differentially-operable control means for the follow-up valve to automatically effect clutch engagement at variable speeds with relation to vehicle engine speeds in accordance with different conditions of operation.

A further object is to provide such a mechanism wherein the auxiliary control mechanism is operable in combination with the gear set to provide different speeds of clutch engagement under different conditions, for example, relatively slow engagement in low and reverse gears, somewhat faster engagement in second gear, and still more rapid engagement in high gear.

Other objects and advantages of the invention will become apparent during the course of the following description.

In the drawings I have shown one embodiment of the invention. In this showing—

Figure 1 is a side elevation of a portion of a motor vehicle power plant showing the invention applied, Figure 2 is an enlarged fragmentary side elevation of the lever mechanism associated with the present invention and connected to the carburetor, Figure 3 is a section taken on line 3—3 of Figure 2, parts being shown in elevation, Figure 4 is an enlarged central vertical sectional view through the control valve mechanism and associated elements, parts being shown in elevation, Figure 5 is an enlarged detail perspective view of the elements of the lever mechanism referred to, shown separated, Figure 6 is a diagrammatic representation of a wiring system for the mechanism, and, Figure 7 is a similar view of a modified form of wiring system.

Referring to Figure 1, the numeral 10 designates the motor vehicle engine as a whole having the usual intake manifold 11 to which fuel is supplied from a carburetor 12 having the usual air cleaner 13 at its upper end. The supply of fuel through the carburetor is governed by the usual butterfly throttle valve 14 (Figure 5) mounted on a shaft 15 (Figures 1, 2 and 5). An operating lever 16, to be described in detail later, is fixed to the shaft 15 to effect turning movement thereof and thus turn the throttle valve 14.

The carburetor is provided with the customary thermostatically operated automatic choke mechanism indicated as a whole by the numeral 17. Such mechanism comprises the usual choke valve (not shown) operable by a crank 18 (Figure 1) to which is connected a rod 19. This rod is connected at its lower end to a mechanism to be described for operating an idle adjusting cam 20 which functions, when the vehicle engine is cold, to cause the engine to idle at a speed higher than the normal idling speed.

The motor is mounted in the usual vehicle frame indicated as a whole by the numeral 21. The rear end of the motor is provided with the usual clutch indicated as a whole by the numeral 22 and provided with the usual clutch elements (not shown) biased to engaged position and adapted to be disengaged by rocking a shaft 23 through the medium of an arm 24 connected thereto. The clutch delivers power from the engine to the usual transmission 25 (Figures 1 and 6). This transmission is provided with the usual shiftable elements adapted to be operated in any desired manner, either manually or by power. In Figure 6 the transmission has been shown for the purpose of illustration as having a low and reverse gear shift rail 26 and this rail is illustrated as being provided with a pair of arms 27 and 28 forming a fork for a purpose to be described. The transmission is also shown as being provided with a second and high gear shift rail 29 having arms 30 and 31 forming a fork, for a purpose to be described.

A fluid pressure operated motor indicated as a whole by the numeral 32 (Figure 1) is adapted to be energized to operate the crank 24. The motor comprises a cylinder 33 having a piston 34 therein connected by a piston rod 35 to the lower end of the crank arm 24. The end of the cylinder 33 adjacent the crank 24 is vented to the atmosphere. The opposite end of the cylinder 33 is pivotally connected as at 36 to a bracket 37 carried by the vehicle frame 21 to permit the motor to swing vertically whereby the pivotal connection between the piston rod 35 and crank 24 can swing about the axis of the shaft 23.

A pipe 38 is connected to the rear or left hand end of the cylinder 33 (Figure 1) and this pipe is connected by a flexible hose section 39 to one end of a pipe 40 leading to a control valve mechanism indicated as a whole by the numeral 41.

This valve mechanism is controlled by movement of the conventional accelerator pedal, to be referred to later, to connect the rear end of the cylinder 33 to the intake manifold 11 to effect clutch disengagement, and to admit air into the same end of the cylinder 33 to permit the conventional clutch springs to move the clutch elements toward and into operative engagement.

The valve mechanism 41 is preferably of the type shown in the prior patent and pending applications referred to above. The valve mechanism comprises a cylindrical body 42 having spaced integral lands 43, 44 and 45 for a purpose to be described. The valve body is provided with an air intake port 46 and this port is preferably provided with a small air cleaner 47.

The valve body is provided with an internally threaded boss 48 to which is connected one end of a pipe 49, and the other end of this pipe is connected to the intake manifold 11 as shown in Figure 1. Longitudinally spaced from the boss 48 and preferably at a diametrically opposite point the valve body is provided with a similar boss 50 having a port 51 leading to the space between the lands 44 and 45, and the boss 50 is connected to the other end of the pipe 40.

A tubular valve 52 is mounted in the valve body and slides in contact with the lands 43, 44 and 45. The valve 52 is provided with two series of circumferentially arranged spaced openings 53 and 54 and these openings are adapted to selectively control connection of the motor 32 to the intake manifold 11 or to the atmosphere.

The left hand end of the valve body 42, as viewed in Figure 4, is provided with an integral annular cup shaped enlargement 55 against which is arranged one face of a diaphragm 56. Against the opposite face of the diaphragm 56 is secured a preferably die cast body 57 by means of screws 58. The member 55 and body 57 have recessed faces adjacent the diaphragm 56 to provide chambers 59 and 60 respectively, for a purpose to be described. The chamber 59 communicates with the interior of the adjacent end of the valve body 42, and is adapted to communicate at all times with the atmosphere through a port 61 in the valve 52, in a manner to be described. The right hand side of the diaphragm 56 accordingly is always subject to atmospheric pressure.

The valve body 42 is provided with an integral connecting portion 62 having a passage 63 therethrough, one end of which communicates with the port 51 and the other end of which communicates with the chamber 60 through a port 64 in the diaphragm 56 and through a groove 65 formed in the adjacent face of the body 57.

The diaphragm 56 is secured as shown in Figure 4 to the adjacent closed end of the valve 52 and a compression spring 66 urges the diaphragm toward the right to tend to return it to the normal position shown. The other end of the spring seats in a cylindrical seat 67 slidable in a cylindrical opening 68 formed axially in the body 57. As will become apparent, the spring seat 67 is at its extreme left hand position when the parts are in the position shown in Figure 4 under which conditions it exerts its minimum pressure tending to move the valve 52 toward the right. Means to be referred to later are employed for varying the loading of the spring 66 under different operating conditions.

A spool valve 69 is mounted within the sleeve valve 52 and is provided with heads 71 and 72 slidable in the sleeve valve 52. The head 72 normally occupies a position just to the right of the series of ports 53, as shown in Figure 4. It will become apparent that the annular space 73 between the valve heads 71 and 72 is in constant communication with the intake manifold through the series of openings 54, through the space between the lands 43 and 44, and thus through the boss 48 and pipe 49. The openings 54 normally lie just to the left of the land 43 and when the valve 52 is moved completely to its left hand limit of movement as viewed in Figure 4, the openings 54 will still be to the right of the land 44, and accordingly the openings 54 are always in communication with the intake manifold.

The spool valve 69 is provided with an axial passage 74 extending therethrough and accordingly the space within the valve 52 to the left of the spool valve 69, as viewed in Figure 4, is always in communication with the atmosphere through the port 46. Movement of the spool valve is accomplished through operation of a stem 75, in a manner to be described, the stem 75 being slidable through a cap 76 on the adjacent end of the valve body 42 and having its inner end extending into the passage 74 and connected to the spool valve by a pin 77.

A lever 78 (Figure 4) is provided with a laterally enlarged central portion 79 engaging the closed end of the seat 67. The end portions of the lever 78 are engaged by adjusting screws 79 to limit movement of the lever 78 toward the left as viewed in Figure 4, and these screws are carried by a cap 80 secured to the body 57. Solenoids 81 and 82 are arranged in suitable pockets formed in the body 57 and these solenoids are respectively provided with armatures 83 and 84, respectively connected as at 85 and 86 with the ends of the lever 78. The connections 85 and 86 are preferably in the form of pin and slot connections to permit linear movement of the armatures 83 and 84 while the respective ends of the lever 78 swing in a manner which will become apparent.

It will be noted in Figure 4 that the armatures 83 and 84 are of somewhat different lengths, the inner end of the armature 83 extending closer to the base 87 of the solenoid 81 than the armature 84 extends toward the base 88 of the armature 82. It will be obvious therefore that energization of the solenoid 81 will attract the armature 83 to move the adjacent end of the lever 78 a shorter distance than the distance of movement of the opposite end of the lever 78 upon energization of the solenoid 82. The solenoids are selectively energizable in a manner to be described to move the ends of the lever 78 different distances to provide different increased loadings of the spring 66 while the solenoids are simultaneously energizable to move both ends of the lever 78 inwardly and thus provide an even greater loading of the spring 66.

One form of electrical control circuit means for the solenoids 81 and 82 is shown in Figure 6 in association with the transmission as described above. A source of current 90, which may be the vehicle battery, has one terminal grounded as at 91 and a wire 92 leads to a swinging contact 93 having its free end insulated and engageable by either of the arms 30 or 31 to be moved into engagement with contacts 94 or 95. The contact 94 is connected to a wire 96 from which a branch 97 leads to the solenoid 82, this solenoid having a return wire 98 connected to a wire 99 grounded as at 100. The contact 95 is connected to a wire 101 from which a branch wire 102 leads to one terminal of the solenoid 81, the other terminal of this solenoid being connected to the wire 99. Movement of the shift rail 29 into high gear engages contact 93 with contact 95 thus closing the circuit through the solenoid 81, while movement of the shift rail 29 into second gear position engages the contact 93 with the contact 94 to energize the solenoid 82. Thus the loading of the spring 66 will be increased to some extent when the vehicle is in high gear and to a greater extent when in second gear.

A switch arm 103 has its free end insulated and arranged for engagement by the fork arms 27 and 28 upon movement of the low and reverse gear shift rail 26. The switch arm 103 is connected by a wire 103' to the wire 92. Movement into low gear causes the arm 28 to move the switch 103 into engagement with a pair of contacts 104 and 105, connected to the respective wires 96 and 101. Movement of the shift rail into reverse gear position causes the switch arm 103 to be moved into engagement with a pair of contacts 106 and 107 which are connected respectively by wires 108 and 109 with the wires 96 and 101. Accordingly, the contacts 106 and 107 are the equivalents of the contacts 104 and 105, and movement of the switch arm 103 into engagement with either pair of these contacts closes parallel circuits through both solenoids 81 and 82, under which conditions the spring 66 (Figure 4) will be compressed to its maximum extent.

As will become apparent, the increased loading of the spring 66, upon operation of the valve 69 in a manner to be described, causes the valve 52 to tend to move further in advance of the valve 69 in the clutch-releasing operation, and this causes movement of the clutch elements into operative engagement to lag to a greater extent than when the spring 66 is more lightly loaded. With the arrangement in Figure 6 maximum loading of the spring 66 is provided in low or reverse gears with consequent relative slow clutch engagement; a lighter spring loading is provided for second gear with a relatively more rapid clutch engagement; and a minimum spring loading is provided in high gear for a still more rapid engagement of the clutch elements in high gear.

The foregoing system provides for relatively more rapid clutch engagement as shifting is effected through first and second gears into high gear. The system provided in Figure 7 contemplates a somewhat different use of the spring loading mechanism to provide different rates of clutch engagement under a different set of conditions. Referring to Figure 7, the source of current is indicated by the numeral 110 and one side of this source is grounded as at 111. The other side of the source is connected by a wire 112 to a switch arm 113 having an insulated end arranged between the arms 30 and 31 previously described. Movement of the shift rail 29 into high gear position does not move the switch arm 113 into engagement with any contact, the normal loading of the spring 66 being depended upon under such conditions. However, when the shift is made into second gear, the arm 113 moves into engagement with a contact 114 carried by a branch wire 115 connected to a wire 116, one end of which leads to the solenoid 81, the other terminal of this solenoid being connected to a wire 117, grounded as at 118.

In the present case the arms 27 and 28 are insulated from the shift rail 26 as at 119 and are electrically connected to the wire 112 by a wire 120. Upon a shift into either low or reverse gears, one of the arms 27 or 28 will engage a contact 121 connected by a wire 122 to a wire 123 one end of which is connected to one terminal of the solenoid 82, the other terminal of this solenoid being connected by a wire 124 to the ground wire 117. A shift into either low or reverse gear, therefore, will energize the solenoid 82 to provide a greater loading of the spring 66 than will normally occur in second gear.

Means are provided whereby the operator may provide the maximum loading of the spring 66 in second gear when shifting to such gear from high gear, to thus provide the maximum speed of clutch operation to allow the vehicle engine speed to accelerate to a substantial extent, prior to clutch engagement. Referring to Figure 7 a gear shift lever arrangement is shown wherein a hollow arm 125 is pivoted as at 126 to turn parallel to the plane of the steering wheel (not shown) of the vehicle, the pivot 126 being carried by arms 127 pivoted as at 128 on an axis perpendicular to the axis of the pivot 126, the pivot 128 being shown as being carried by a suitable support 129. The pivot 128 permits movement of the shift arm 125 toward and away from the steering wheel whereby selection of the desired shift rail may be made.

A shift handle 130 is pivoted as at 131 to the shift arm 125 and is normally held in the position shown in Figure 7 by a spring 132. The inner end 133 of the shift handle is connected to the other end of the wire 123, while the other end of the wire 116 is connected to a contact 134 engageable by the end 133 of the shift handle 130 when a shift is made into second gear. This closes the circuit, when in second gear, through contact 114, wire 116, contact 134, handle portion 133 and wire 123 through the solenoid 82, the circuit through the solenoid 81 being completed through the other end of the wire 16 when the switch arm 113 engages the contact 114 when in second gear. Accordingly, when in second gear, the operator can cause both solenoids 81 and 82 to be energized, and this fact is utilized when the shift is made from high to second gear to increase the loading of the spring 66 to its maximum to provide the minimum speed of clutch engagement for the purpose stated.

The mechanism for operating the spool valve 69 may be identical with the mechanism shown in the copending application of Edward G. Hill and Henry W. Hey, Serial No. 369,498, referred to above. The advantages of using such type of operating mechanism will become apparent. Referring to Figures 1, 2 and 5 it will be noted that the valve operating rod 75 is connected by a swivel 135 to a lever 136 pivotally connected at its lower end as at 137 to the lower end of the throttle lever 16. A light torsion spring 138 surrounds the pivot pin 137 to tend to turn the lever 136 in a clockwise direction about the pivot 137.

A rod 139 has one end pivotally connected as at 140 to the lever 136 approximately midway between the swivel 135 and pivot 137. The other end of the rod 139 is pivoted as at 141 to the lower end of an arm 142, such arm forming one lever arm of a bell crank lever 143 pivoted as at 144 to the engine 10 or to any other suitable support. The arm 142 is substantially longer than the second arm 145 of the bell crank lever 143, and the arm 145 is connected to one end of a rod 146 as shown in Figure 1. The other end of this rod is connected to the accelerator treadle 147 which is provided with a spring 148 for biasing the treadle 147 to the normal or idling position, the spring 148 being stronger than the spring 138 for a reason which will become apparent.

At its upper end, the lever 136 is provided in the plane thereof with a projection 149 for a purpose to be described. At its opposite edge, the lever 136 is provided with a laterally extending ear 150 adapted to receive a screw 151 (Figures 2 and 3) adapted to be secured in adjusted positions by a lock nut 152. The screw 151 is provided in its inner end with a head 153 for a purpose to be described.

The lever 16 is provided intermediate its ends with a lateral offset 154 the end of which is extended upwardly to form an arm 155 parallel to the plane of the body of the lever 16 and preferably provided with a plurality of openings 156. These openings are adapted to selectively receive the lower end of a rod 157 connected to the carburetor accelerating pump (not shown). The plurality of openings 156 is provided to selectively receive the lower end of the rod 157 to adjust the effective length of the latter. As shown in Figure 3 the projection 149 on the lever 146 is arranged in the plane of the arm 155 and, as will be apparent from Figure 2, is engageable therewith after the lever 136 has turned a predetermined distance about its pivot 137.

The idle cam 20, previously referred to, is pivotally mounted on a shaft 158 (Figure 3) the inner end of which is tapped into a wall of the carburetor 12. The cam 20 is arranged within a substantially U-shaped actuating member 159 the two side walls of which are connected at the bottom thereof by a web 160 and this web engages the cam 20 to elevate it when the motor is cold. A ball 159', carried by the member 159, is arranged in a socket on the lower end of the rod 19 whereby vertical movement of the latter rocks the member 159. A lever arm 160 is also mounted on the shaft 158 and the end of this lever arm is adapted under conditions to be described to engage the head 153 (Figures 2 and 3) to limit the turning movement of the lever 136 about the pivot 137 to a greater extent than such movement is normally limited by engagement of the projection 149 with the arm 155.

The lever 16 is provided at its upper end with a lateral offset 161 in which is threaded a screw 162 engageable with the cam 20 to limit the turning movement of the throttle lever 16 toward idling position. A spring 163 surrounds the screw 162 and frictionally resists turning movement thereof from any adjusted position.

It will be apparent, therefore, that when the motor is cold the conventional thermostatically controlled choke mechanism, operating through the rod 19 and member 159, holds the cam 20 in such position that the cam 20, engaging the screw 162, holds the throttle lever 16 further away from the normal idling position, thus causing the vehicle engine to idle at a higher speed. When the motor is cold it is desirable for the accelerator-operated lever 136 to pick up the throttle lever 16 at an earlier point in the downward movement of the treadle 147, and it is under such conditions that the lever arm 160 is brought into a position to be engaged by the screw 153. A torsion spring 164 (Figures 2 and 3) surrounds the shaft 158 and tends to turn the lever arm 160 in a clockwise direction as viewed in Figure 2. Accordingly when the carrier 159 and cam 20 turn in a clockwise direction, as viewed in Figure 2, from their normal position, when the motor is cold, the lever arm 160 turns in the same direction whereupon the end of the lever 160 will be arranged in a position to be engaged by the screw 153.

As the vehicle engine warms up, the rod 19 rotates the carrier 159 in a counterclockwise direction as viewed in Figure 2 and the corresponding turning of the cam 20 renders the lever arm 160 inoperative. For this purpose, the cam 20 is provided with an arm 165 to the end of which is connected a rod 166 having a horizontally extending end 167 engageable with an arm 168 carried by the lever arm 160. When the cam 20 rotates in a counterclockwise direction (Figure 2) the rod end 167 engages the arm 168 and swings it upwardly, thereby swinging the lever arm 160 downwardly to inoperative position.

The operation of the apparatus is as follows:

The present apparatus is intended to render the mechanism of the patent to Edward G. Hill, No. 1,964,693, referred to above, perfect in operation under all of the conditions encountered in the operation of a motor vehicle. For example, the prior construction provides for instantaneous releasing of the clutch elements for rapid movement to the point at which initial engagement of the elements takes place, upon initial depression of the accelerator pedal, whereupon the movement of the clutch elements is checked. Further depression of the accelerator pedal will then accelerate the vehicle engine and at the same time will slowly release the clutch elements for movement into full operative engagement.

Such mechanism, without the exercise of any judgment on the part of the operator provides perfect operation when the shift is made into high gear and satisfactory operation after a shift is made into second gear, provided the motor is operating under normal temperature conditions. With a little skill on the part of the operator it will operate perfectly in low and reverse gears. However, the mechanism does not provide for earlier engine acceleration and slower clutch engagement when the engine is cold, nor does it provide means for substantially accelerating the engine speed prior to clutch engagement when a shift is being made from high back to second gear. The present invention takes care of all of the various operating conditions referred to except for cold motor conditions and a shift down from high to second gear when the system in Figure 6 is employed, and the electrical system in Figure 7 takes care of the additional condition which is met in shifting down from high to second gear. Moreover, there is shown in the present application the means described and claimed in the copending application of Edward G. Hill and Henry W. Hey, Serial No. 369,498, for providing proper clutch engagement when the vehicle engine is cold.

Assuming that the gear set is in neutral and the engine is idling after having been properly warmed up, the valve mechanism and the associated parts will occupy positions with the valves 52 and 69 moved to their extreme left hand positions with the ports 53 in communication with the vacuum space 73, and accordingly the motor 32 (Figure 1) will be connected to the intake manifold and the clutch elements will be held disengaged. At the same time, the lever arm 160 will be swung downwardly from the position in Figure 2 so as not to be engageable by the screw head 153. Assuming that the shift is to be made into low gear, using the electrical system shown in Figure 6, the shift rail 26 will be moved to the left as viewed in Figure 6 to engage the switch arm 103 with both of the contacts 104 and 105. Under such conditions current will flow from the source 90 through wire 103' switch arm 103, contacts 104 and 105 through the wires 96 and 97, and wires 101 and 102, to the respective solenoids 81 and 82 and thence through the return wires of these solenoids and through grounds 100 and 91, back to the source.

Referring to Figure 4 it will be noted that this operation energizes both solenoids 81 and 82, thus attracting both armatures 83 and 84 to move the lever 78 and compress the spring 66 to its maximum extent. It will be noted that at this time the vacuum present in the motor 32 and in the lines leading thereto will be communicated to the chamber 60 (Figure 4) and since the chamber 59 communicates with the atmosphere through port 61 and passage 74, the differential pressure on opposite sides of the diaphragm 56 will hold this diaphragm near its extreme left hand position, the maximum loading of the spring 66 holding the diaphragm, and consequently the valve 52, slightly to the right of the extreme left hand position.

The openings 53 (Figure 4) already will have been in communication with the vacuum space 73 and the maximum loading of the spring 66 will move the openings 53 slightly further to the right as viewed in Figure 4, thus requiring further movement of the valve 69 to the right than otherwise would be necessary in order to establish initial communication between the ports 53 and passage 74. It will become apparent that this fact assists in causing a relative lagging of the movement of the clutch elements into operative engagement upon the depression of the accelerator pedal.

Assuming that the operator is now ready to start the vehicle, he will depress the accelerator pedal 147, thus turning the bell crank lever 143 (Figure 1) in a counter-clockwise direction and the rod 139 will be moved to the right to turn the lever 136 in a clockwise direction about its pivot 137.

The lever 136 is free to turn about its pivot 137 independently of the lever 16 until the projection 149 engages the arm 155. Movement of the lever 136 transmits movement to the valve 69, through rod 75, to move it toward the right as viewed in Figure 4. Relatively late during the free movement of the lever 136 with respect to the lever 16, the valve head 72 (Figure 4) will move across the ports 53 to close communication between these ports and the vacuum space 73 and initially open communication between the ports 53 and the air passage 74. The point at which initial communication between ports 53 and passage 74 occurs will be later during the operation being considered than will be true under any other operating conditions due to the maximum loading of the spring 66.

When the ports 53 are uncovered to the atmospheric passage 74, air will rush through the ports 53, port 51 and pipe 40 into the motor 32 (Figure 1) thus greatly decreasing the differential pressures previously existing on opposite sides of the piston 34, whereupon the usual biasing springs (not shown) of the clutch 22 will move the clutch elements toward operative engagement. It will be noted that the position of the diaphragm 56 and its movement is determined by the tension of the spring 66 and the differential pressures affecting opposite sides of the diaphragm, these pressures in turn being depended upon the pressure in the vacuum end of the cylinder 33, since the chamber 60 is subject to the same pressure as the cylinder 33 through the passage 63.

The partial vacuum in the cylinder 33 when the clutch is disengaged or is moving toward engagement is dependent upon three factors, namely, the area of the piston 34, the speed of movement of this piston and the effective areas of the ports 53 when these ports are partially uncovered. As air is admitted into the cylinder 33 to release the clutch elements toward operative engagement, the air pressure rises in the cylinder 33 and in the connections thereto, the rise in pressure being determined by the three factors referred to, and exactly the same rise in pressure will occur in the chamber 60, thus permitting the spring 66 to move the diaphragm 56 toward the right as viewed in Figure 4.

Accordingly, as the valve 69 moves toward the right (Figure 4) air will be admitted into the clutch motor through the ports 53 and the clutch elements will move toward operative engagement and the same rise in pressure that permits this movement to take place occurs in the chamber 60 and the spring 66 will cause the valve 52 to follow-up with respect to the valve 69. If the downward movement of the accelerator pedal 147 should be arrested, movement of the valve 69 will stop, whereupon the valve 52 will move only the slight distance necessary in order for the valve head 72 to cut off the ports 53 from the atmosphere. Movement of the clutch elements will immediately stop since admission of air into the clutch motor will be cut off.

Ordinarily, in starting the vehicle, the operator will continue to depress the accelerator pedal at a uniform speed, but it is an inherent characteristic of the valve mechanism shown that it will not permit correspondingly uniform movement of the clutch elements into operative engagement. As previously stated, the speed of movement of the clutch elements toward operative engagement is controlled by the three factors described, and upon initial light contact of the clutch elements, one of these three factors is disturbed and alters the operation of the valve mechanism. Upon initial light contact of the clutch elements, the speed of movement of the piston 34 (Figure 1) will be retarded, and the rush of air into the clutch motor through the ports 53 will tend more fully to satisfy the partial vacuum in the clutch motor, thus resulting in an instantaneous increase in pressure in the clutch motor. This increase in pressure occurs equally instantaneously in the chamber 60, thus more nearly balancing pressures on opposite sides of the diaphragm 56, whereupon the spring 66 will immediately move the valve 52 further to the right (Figure 4) and cut off the admission of air to the clutch motor through the ports 53. The movement of the clutch elements will thus be immediately momentarily arrested or retarded, depending upon the speed of operation of the accelerator pedal, which determines the speed of movement of the valve 69.

Continued movement of the valve 69 toward the right (Figure 4) occurring through continued depression of the accelerator pedal, will subsequently slightly uncover the ports 53 and again admit air into the clutch motor, to permit the clutch elements to move toward operative engagement, and the pressure will again increase in the chamber 60 permitting the diaphragm 56 to move the valve 52 to cause the latter to resume its follow-up action with respect to the valve 69. This operation is continued until the clutch is fully in engagement and the vehicle has attained the desired speed in low gear.

In the operation considered above, the spring 66 will have been loaded to its maximum extent, and for any given differential pressures on opposite sides of the diaphragm 56, the valve 52 will occupy a position further to the right (Figure 4) than it will under conditions in which the spring 66 is loaded to a necessary extent. Accordingly, the admission of air through the ports into the clutch motor takes place progressively later with relation to the progresive movement of the valve 69 in the clutch engaging operation. This, of course, causes a lagging of the movement of the clutch elements in low gear, thus providing the desired relatively slow or gradual clutch engagement in low gear.

As previously stated, initial movement of the accelerator treadle from idling position turns the lever 136 about its pivot 137 independently of the lever 16, such lever during the period referred to remaining stationary with the throttle valve in idling position. During this period, movement is transmitted to the lever 136 through rod 139 which is connected to the lever 136 approximately half-way between the pivot 137 and the swivel 135. Accordingly this swivel, and the rod 75 and valve 69 actuated thereby, will be moved approximately twice as fast as the accelerator-operated rod 139. This rapid movement of the valve 69 is provided in order that air may be admitted into the clutch motor to provide for movement of the clutch elements approximately to the point of initial engagement before the throttle 14 starts to open so that engine acceleration and operative clutch engagement may take place approximately simultaneously.

Accordingly, at or slightly prior to the initial engagement of the clutch elements, the projection 149 will come into contact with the upper end of the arm 155. Under the conditions being considered, that is, with the maximum loading of the spring 66 with the gear set in low or reverse gear, the lagging of the movement of the clutch elements is such that the projection 149 will engage the arm 155 slightly prior to actual contact of the clutch elements.

After the foregoing point is reached, further depression of the accelerator pedal will cause the rod to move the lever 136 and this lever, in turn, will move the throttle lever 16, since the two levers will now be moving as a unit. Accordingly further movement of the lever 136 will now take place about the axis of the throttle shaft 15. The distance between this shaft and the swivel 135 is approximately one-half the distance from the shaft 15 to the point 140 at which the rod 139 is connected to the lever 136. After the two levers start to move as a unit, therefore, the valve-operating rod 75 will move at approximately one-half the speed of the accelerator-operated rod 139, instead of twice as rapidly, which was true up to the point the two levers started to move as a unit. Accordingly movement of the clutch elements from the point of initial light contact into complete operative engagement takes place relatively slowly, and as previously stated, the maximum loading of the spring 66 under the conditions being considered, causes a lagging of the clutch elements into operative engagement with respect to the opening of the throttle, and accordingly stalling of the motor or jerky clutch engagement is prevented.

Although relatively slow operative engagement of the clutch elements will take place under the conditions being considered, the time required for movement of the clutch elements from the completely disengaged position to the completely engaged position is minimized through the operation of the levers 16 and 136 as described, this mechanism causing extremely rapid movement of the clutch elements up to the point of initial light engagement.

The foregoing description covers the complete operation when engaging the clutch elements with the gear set in low gear, and after the desired vehicle speed has been attained, the accelerator treadle 147 is released, whereupon the bell crank lever 143 is turned in a clockwise direction, pulling to the left on the levers 136 and 16. These levers will move as a unit up to the point at which the screw 162 engages the idle cam 20, whereupon the throttle lever 16 will remain stationary and the lever 136 will turn in a counterclockwise direction about the pivot 137. Due to the leverage arrangements referred to, the accelerator-operated rod 139 will move at twice the speed of the rod 75, up to the point where the screw 162 engages the idle cam 20 after which the rod 175 will move twice as rapidly as the rod 139 to transmit correspondingly rapid movement to the valve 69 (Figure 4).

Movement of the valve 69 to the left as viewed in Figure 4 causes the head 72 to uncover the ports 53 to the vacuum space 73, thus connecting the clutch motor to the source of vacuum, whereupon clutch disengagement will take place with the valve 52 following-up with respect to the valve 69. This is due to the fact that reductions in pressure in the clutch motor are accompanied by similar reductions in pressure in the chamber 60, and accordingly the diaphragm 56 and valve 52 will move to the left so long as the valve 69 is similarly moved until the limits of movement of these two valves are reached. The valves will stop when the disks attached to the diaphragm 56 contact with the left hand wall of the chamber 60 as viewed in Figure 4, and when the accelerator pedal reaches its idling position the valve 69 will stop. When the two valves are at their limits of movement, the ports 53 will be arranged slightly to the right of the land 45 and the valve head 72 will be arranged slightly to the left of the ports 53 to maintain these ports in communication with the vacuum space 73 to hold the clutch disengaged pending the next operation of the accelerator.

Each depression of the accelerator causes the same operation of the entire apparatus except for the tensioning of the spring 66, which will be further described and accordingly no further detailed description is necessary. After the shift has been made into second gear the operator will depress the accelerator pedal to cause engine acceleration and clutch engagement, after which he will release the accelerator pedal, shift into high gear, and again depress the accelerator pedal.

When the shift is made into second gear from low gear, the shift rail 26 (Figure 6) first will be restored to the neutral position shown, after which the shift rail 29 will be moved to the right as viewed in Figure 6 to bring the switch 93 into engagement with the contact 94. Thus the circuit will be closed from the source through wire 92, switch 93, contact 94, wires 96 and 97, solenoil 82, and thence back to the source through wires 98 and 99 and grounds 100 and 91. It will be noted that the circuit will not be closed through the solenoid 81, as was true in low gear, but only through the solenoid 82. As clearly shown in Figure 4, the armature 84 of the solenoid 82 has a greater throw than the armature 83 and when the armature 84 is actuated it will cause a greater compression of the spring 66 than when the armature 83 is actuated under conditions to be described, but will not compress the spring 66 to as great an extent as is true when both solenoids are energized, as when the clutch is engaged with the gear set in low gear.

Accordingly when clutch engagement takes place with the gear set in second gear, the spring 66 will be loaded to a moderate extent, and it will not require as great differential pressure on opposite sides of the diaphragm 56 to balance or overcome the tension of the spring 66 in any given position of the valve 52 as was true under low gear conditions. Accordingly for any given partial vacuum in the clutch motor and in the chamber 60 the valve 52 will not be as far to the right (Figure 4) as would be true under the same conditions in low gear. For this reason there is less lagging of the clutch elements into operative engagement in second gear than was true in first gear, and accordingly a more rapid operative engagement of the clutch elements takes place when the accelerator is depressed. This is the desirable operation in second gear since clutch engagement can take place more rapidly when the vehicle is moving at a moderate speed than can take place when the vehicle is being moved from a standstill.

When the shift is made into high gear the shift rail 29 is moved to the left as viewed in Figure 6 and the switch 93 will engage the contact 95 to close a circuit through wires 101 and 102 through the solenoid 81 and thence back to the source as will be obvious. The solenoid 81 will be energized but the circuit will not be closed through the solenoid 82, and accordingly the armature 83 will be actuated and its throw is substantially less than the throw of the armature 84. Accordingly the spring 66 will be even more lightly loaded than in second gear. Thus it will be obvious that for any given position of the valve 69 the valve 52 will be arranged slightly further to the left as viewed in Figure 4, than would be true when the second gear shift is made. Thus in high gear there would be even less lagging of the movement of the clutch elements into operative engagement, and the relatively rapid operative engagement of the clutch elements, which is practicable in high gear, will take place.

The operation for reverse gear is identical with that for low gear, the closing of the circuit across the switch 103 and contacts 106 and 107 being the same as when the switch engages the contacts 104 and 105 since the pairs of contacts are respectively connected by the wires 108 and 109. This arrangement provides for the same relatively slow engagement of the clutch elements under the conditions in which this is highly desirable, that is, when the vehicle is being started from a standstill in either low or reverse gears.

The system disclosed in Figure 6, therefore, provides a mechanism operative in conjunction with the valve mechanism of the patent to Edward G. Hill, referred to above, and also in conjunction with the lever mechanism in Figure 2, as disclosed in the copending applications of Edward G. Hill and Henry W. Hey, whereby the earlier mechanisms are rendered highly perfect and practicable in operation for providing the smoothest possible clutch engagement regardless of the gear ratio for which the transmission has been set, and this operation is insured without any skill whatever on the part of the operator. It also will be apparent that regardless of the gear ratio, slower clutch engagement should take place when the vehicle engine is cold and more easily stalled, and the operation of the solenoid mechanism combines with the operation of the lever arm 160 in such a way that clutch engagement takes place at variable speeds in accordance with the gear ratio, but always slower when the vehicle engine is cold.

Referring to Figures 1 and 2, the rod 19 is connected to the carrier 159 to rotate the latter in a clockwise direction when the motor is cold, due to the operation of the conventional automatic choke valve operation. When the cold motor position is reached, the torsion spring 164 will have turned the lever arm 160 to the position shown in Figure 2 in which case the end of the lever arm 160 will be arranged much closer to the screwhead 153 than the projection 149 is arranged with respect to the upper end of the arm 155. When the accelerator is depressed, therefore, regardless of the gear ratio, the degree of independent movement of the lever 136 about its pivot 137 will be much shorter than when the lever arm 160 is in its lower or inoperative position, and accordingly the lever 136 will "pick up" the lever 16 at a much earlier point. As previously stated, the valve operating rod 75 moves twice as fast during independent movement of the lever 36 as it does after this lever picks up the lever 16. Accordingly, when the motor is cold, the levers 16 and 136 start to move as a unit at a much earlier point, and substantially before initial contact of the clutch elements takes place, and accordingly the valve 69 (Figure 4) will start to move relatively slowly much sooner than when the vehicle engine is warmed up. The result is that while clutch engagement takes place at variable speeds in accordance with the operation of the solenoids 81 and 82, it will take place more slowly under each gear set condition when the motor is cold than when it is warmed up, thus preventing the stalling of the vehicle engine when it is cold. As the engine warms up the rod 19 will progressively move downwardly to turn the member 159 and the arm 165 and rod end 167 will engage the arm 168 to progressively turn the lever arm 160 downwardly toward its inoperative position. Thus as the engine warms up, each depression of the accelerator pedal will effect progressively greater independent movement of the lever 136, and the point at which movement of the levers 16 and 136 starts to take place as a unit will occur later. After the engine has been thoroughly warmed up the lever arm 160 will become completely inoperative and independent movement of the lever 136 will be determined by the projection 149 and arm 155.

The system shown in Figure 7 is a variation of the electrical control system for the solenoids 81 and 82 through which substantially the same controlling of the functioning of the spring 66 takes place, but wherein the maximum spring loading is employed to cause a substantial lagging of clutch engagement to permit engine speed to be accelerated when a shift is being made from high to second gear. These various operations need not be referred to in substantial detail. It will become apparent that if the system shown in Figure 7 is employed the control mechanism in Figure 4 should be altered somewhat for reasons which will become apparent, for example, by shortening the spring 66 so that any given movement of the sleeve 67 will compress the spring 66 to a proportionally greater extent than when the system in Figure 6 is used.

Referring to Figure 7 it will be noted that the shift of the rail 26 into either low or reverse gear will engage one of the arms 27 or 28 with the contact 121, thus closing a circuit from the source through the wires 112 and 120, through the contact 121, wires 122 and 123, and thus through the solenoid 82 and wires 124 and 117 and grounds 118 and 111. The armature 84 of the solenoid 82 has the greater throw of the two armatures and will compress the spring 66, preferably to a substantially greater extent than when the system in Figure 6 is used, to provide the proper operation of the valve mechanism for a smooth clutch engagement in low or reverse gears.

When a shift is made into second gear the switch 113 engages the contact 114 to complete a circuit through wires 115 and 116 through the solenoid 81 and thence back to the source through wire 117, etc. The armature 83 has a shorter throw than the armature 84 and will compress the spring 66 to a less extent, thus causing less lagging of the clutch engagement in second gear than in low or reverse gears. For high gear neither solenoid is energized and the normal loading of the spring 66 is depended upon for the proper operation of the control valve mechanism. The proper operations for the four gear positions may be accomplished by using a heavier spring 66 having a greater normal loading or by using a shorter spring 66, and preferably both, so that the greater normal loading of the spring will properly take care of the high gear clutch engagement.

The system in Figure 7 is particularly useful for adding to the control mechanism a means whereby the operator may shift back from high to second gear and provide for a substantial lagging of clutch engagement to allow ample time for engine acceleration prior to operative clutch engagement. Assuming that the vehicle is in high gear and the operator desires to shift back into second gear, he will release the accelerator to disengage the clutch, and then shift back into second gear, closing the circuit at the contact 114 through the solenoid 81. This immediately actuates the armature 83 and increases the normal loading of the spring 66. When shifting from high into second gear the operator will have grasped the handle 130 to turn the handle and shift lever 125 in a counterclockwise direction as viewed in Figure 7. This operation closes the circuit across switch 133 and contact 134, thus completing a circuit from contact 114 through wires 115 and 116, across contact 134 and arm 133, and thus through wire 123 through the solenoid 82. With the arrangement shown, which is purely for the purpose of illustration, the operator will hold the handle 130 in a position to maintain the arm 133 in engagement with the contact 134 until after the clutch has been re-engaged.

Under the above circumstances, both solenoids 81 and 82 will be energized and the spring 66 will be loaded to its maximum extent, thus providing a maximum lagging of the clutch elements whereby depression of the accelerator pedal will cause substantial engine acceleration before operative clutch engagement takes place, and the jerking or lunging incident to the engaging of the clutch elements when they are rotating at substantially different speeds is eliminated.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A clutch control mechanism for a motor vehicle clutch, comprising a clutch operating motor, a follow-up control mechanism for energizing the motor to disengage the clutch and for deenergizing the motor to release the clutch for controlled movement of the elements thereof into engagement, said control mechanism including a device for controlling the follow-up action of said control mechanism in its motor-deenergizing function to effect a predetermined mode of clutch engagement, auxiliary control means connected to and constructed and arranged to act in conjunction with said device to alter the operation thereof for causing a relative lagging of the movement of the clutch elements into engagement, and a second auxiliary control means connected to and constructed and arranged to act in conjunction with said device to cause a relatively greater lagging of the movement of the clutch elements into operative engagement.

2. A clutch control mechanism for a motor vehicle clutch, comprising a clutch operating motor, a follow-up control mechanism for energizing the motor to disengage the clutch and for deenergizing the motor to release the clutch for controlled movement of the elements thereof into engagement, said control mechanism including a device for controlling the follow-up action of said control mechanism in its motor-deenergizing function to effect a predetermined mode of clutch engagement, auxiliary control means connected to and constructed and arranged to act in conjunction with said device for causing a relative lagging of the movement of the clutch elements into engagement, and a second auxiliary control means connected to and constructed and arranged to act in conjunction with said device to cause a relatively greater lagging of the movement of the clutch elements into operative engagement, said auxiliary control means being constructed and arranged for simultaneous operation to cause still further lagging of the movement of the clutch elements into operative engagement.

3. A clutch control mechanism for a motor vehicle clutch, comprising a clutch operating motor, a follow-up control mechanism for energizing the motor to disengage the clutch and for deenergizing the motor to release the clutch for controlled movement of the elements thereof into engagement, said control mechanism including a device for controlling the follow-up action of said control mechanism in its motor-deenergizing function to effect a predetermined mode of clutch engagement, auxiliary control means connected to and constructed and arranged to act in conjunction with said device for causing a relative lagging of the movement of the clutch elements into engagement, a second auxiliary control means connected to and constructed and arranged to act in conjunction with said device to cause a relatively greater lagging of the movement of the clutch elements into operative engagement, and means for rendering said pair of auxiliary control means simultaneously operative to effect a still further lagging of the movement of the clutch elements into operative engagement.

4. A clutch control mechanism for a motor vehicle clutch, comprising a motor connected to the clutch, a control mechanism for energizing the motor to disengage the clutch elements and for deenergizing the motor for releasing the clutch elements for movement into operative engagement, said control mechanism including spring means constructed and arranged for controlling the rate of engagement of the clutch elements upon a motor-deenergizing operation of said control mechanism, and a pair of selectively operable means for changing the loading of said spring means to different extents for causing different degrees of lagging in the rate of movement of the clutch elements into operative engagement.

5. A clutch control mechanism for a motor vehicle clutch, comprising a motor connected to the clutch, a control mechanism for energizing the motor to disengage the clutch elements and for deenergizing the motor for releasing the clutch elements for movement into operative engagement, said control mechanism including spring means constructed and arranged for controlling the rate of engagement of the clutch elements upon a motor-deenergizing operation of said control mechanism, and a pair of selectively operable means for changing the loading of said spring means to different extents for causing different degrees of lagging in the rate of movement of the clutch elements into operative engagement, said pair of means being constructed and arranged for simultaneous operation to cause a still different loading of said spring means to effect a different rate of lagging of the clutch elements into operative engagement.

6. A clutch control mechanism for a motor vehicle clutch, comprising a motor connected to the clutch, a control mechanism for energizing the motor to disengage the clutch elements and for deenergizing the motor for releasing the clutch elements for movement into operative engagement, said control mechanism including spring means constructed and arranged for controlling the rate of engagement of the clutch elements upon a motor-deenergizing operation of said control mechanism, a pair of selectively operable means for changing the loading of said spring means to different extents for causing different degrees of lagging in the rate of movement of the clutch elements into operative engagement, and means for rendering said pair of means simultaneously operative for still differently loading said spring means to provide a still further lagging of the movement of the clutch elements into operative engagement.

7. A clutch control mechanism for a motor vehicle clutch comprising a fluid pressure motor, a follow-up control valve mechanism therefor operative for energizing said motor for disengaging the clutch and for deenergizing said motor to release the clutch elements for controlled movement into operative engagement, said control valve mechanism including a device for controlling the follow-up action of said control valve mechanism in its motor-deenergizing function to effect a predetermined mode of clutch engagement, an auxiliary control means connected to and constructed and arranged to control said device to cause a relative lagging of the movement of the clutch elements into operative engagement, and a second auxiliary control means connected to and constructed and arranged to control said device to cause a further lagging of the rate of movement of the clutch elements into operative engagement.

8. A clutch control mechanism for a motor vehicle clutch comprising a fluid pressure motor, a follow-up control valve mechanism therefor operative for energizing said motor for disengaging the clutch and for deenergizing said motor to release the clutch elements for controlled movement into operative engagement, said control valve mechanism including a device for controlling the follow-up action of said control valve mechanism in its motor-deenergizing function to effect a predetermined mode of clutch engagement, an auxiliary control means connected to and constructed and arranged to control said device to cause a relative lagging of the movement of the clutch elements into operative engagement, and a second auxiliary control means connected to and constructed and arranged to control said device to cause a further lagging of the rate of movement of the clutch elements into operative engagement, said two auxiliary means being constructed and arranged for simultaneous operation to control said valve mechanism to effect a still further lagging of the movement of the clutch elements into operative engagement.

9. A clutch control mechanism for a motor vehicle clutch comprising a fluid pressure motor, a follow-up control valve mechanism therefor operative for energizing said motor for disengaging the clutch and for deenergizing said motor to release the clutch elements for controlled movement into operative engagement, said control valve mechanism including a device for controlling the follow-up action of said control valve mechanism in its motor-deenergizing function to effect a predetermined mode of clutch engagement, an auxiliary control means connected to and constructed and arranged to control said device to cause a relative lagging of the movement of the clutch elements into operative engagement, a second auxiliary control means connected to and constructed and arranged to control said device to cause a further lagging of the rate of movement of the clutch elements into operative engagement, and means for effecting simultaneous operation of said two auxiliary means for controlling said valve mechanism to effect a still further lagging of the rate of movement of the clutch elements into operative engagement.

10. A clutch control mechanism for a motor vehicle clutch comprising a fluid pressure motor connected to the clutch, a control valve mechanism for energizing said motor to disengage the clutch and for progressively establishing pressure equalization in said motor to release the clutch elements for movement into operative engagement, a spring device constructed and arranged to control said valve mechanism to control the timing of the movement of the clutch elements into operative engagement with relation to operation of said valve mechanism, and a pair of means selectively operable for differently changing the loading of said spring device to cause different rates of lagging of the movement of the elements of the clutch into operative engagement with relation to operation of said valve mechanism.

11. A clutch control mechanism for a motor vehicle clutch comprising a fluid pressure motor connected to the clutch, a control valve mechanism for energizing said motor to disengage the clutch and for progressively establishing pressure equalization in said motor to release the clutch elements for movement into operative engagement, a spring device constructed and arranged to control said valve mechanism to control the timing of the movement of the clutch elements into operative engagement with relation to operation of said valve mechanism, and a pair of means selectively operable for differently changing the loading of said spring device to cause different rates of lagging of the movement of the elements of the clutch into operative engagement with relation to operation of said valve mechanism, said pair of means being constructed and arranged for simultaneous operation to provide a still different loading of said spring device to cause a still different lagging of the movement of the clutch elements into operative engagement with relation to operation of said valve mechanism.

12. A clutch control mechanism for a motor vehicle clutch comprising a fluid pressure motor connected to the clutch, a control valve mechanism for energizing said motor to disengage the clutch and for progressively establishing pressure equalization in said motor to release the clutch elements for movement into operative engagement, a spring device constructed and arranged to control said valve mechanism to control the timing of the movement of the clutch elements into operative engagement with relation to operation of said valve mechanism, a pair of means selectively operable for differently changing the loading of said spring device to cause different rates of lagging of the movement of the elements of the clutch into operative engagement with relation to operation of said valve mechanism, and means constructed and arranged to render said pair of means simultaneously operative for effecting a still different loading of said spring device to provide a still different movement of the clutch elements into operative engagement with relation to operation of said valve mechanism.

13. A clutch control mechanism for a motor vehicle clutch, comprising a motor connected to the clutch, a control mechanism for energizing the motor to disengage the clutch and for progressively deenergizing the motor to release the clutch elements for movement into operative engagement, said control mechanism having a spring device cooperating therewith and having a predetermined loading to control the movement of the clutch elements into operative engagement, a lever engageable with said spring device, and a pair of devices connected to said lever and selectively operative for moving said lever to differently load said spring device to differently control the movement of the clutch elements into operative engagement.

14. A clutch control mechanism for a motor vehicle clutch, comprising a motor connected to the clutch, a control mechanism for energizing the motor to disengage the clutch and for progressively deenergizing the motor to release the clutch elements for movement into operative engagement, said control mechanism having a spring device cooperating therewith and having a predetermined loading to control the movement of the clutch elements into operative engagement, a lever engageable with said spring device, a pair of devices connected to said lever and selectively operative for moving said lever to differently load said spring device to differently control the movement of the clutch elements into operative engagement, and means for simultaneously operating said pair of devices to still differently load said spring device to provide a still different movement of the clutch elements into operative engagement.

15. A clutch control mechanism for a motor vehicle clutch comprising a motor connected to the clutch, a follow-up control mechanism for energizing the motor to disengage the clutch and for progressively deenergizing the motor to release the clutch elements for movement into operative engagement, said control mechanism having a manually movable element and a follow-up element, and further comprising a spring device having a predetermined loading for controlling the movement of said follow-up element to control the movement of the clutch elements into operative engagement with relation to operation of said manually operable element, and a pair of auxiliary control devices constructed and arranged to be selectively operable for changing the loading of said spring device to provide for respectively different relative lagging of the movement of the clutch elements into operative engagement with relation to movement of said manually operable element.

16. A clutch control mechanism for a motor vehicle clutch comprising a motor connected to the clutch, a follow-up control mechanism for energizing the motor to disengage the clutch and for progressively deenergizing the motor to release the clutch elements for movement into operative engagement, said control mechanism having a manually movable element and a follow-up element, and further comprising a spring device having a predetermined loading for controlling the movement of said follow-up element to control the movement of the clutch elements into operative engagement with relation to operation of said manually operable element, a pair of auxiliary control devices constructed and arranged to be selectively operable for changing the loading of said spring device to provide for respectively different relative lagging of the movement of the clutch elements into operative engagement with relation to movement of said manually operable element, and means for simultaneously operating said auxiliary control devices to provide for a still different relative lagging of the movement of the clutch elements into operative engagement.

17. A clutch control mechanism for a motor vehicle clutch comprising a motor connected to the clutch, a follow-up control mechanism for energizing the motor to disengage the clutch and for progressively deenergizing the motor to release the clutch elements for movement into operative engagement, said control mechanism having a manually movable element and a follow-up element, and further comprising a spring device having a predetermined loading for controlling the movement of said follow-up element to control the movement of the clutch elements into operative engagement with relation to operation of said manually operable element, a lever connected to said spring device, and a pair of means connected to said lever and selectively operable for differently loading said spring device to effect different relative lagging movements of the clutch elements into operative engagement.

18. A clutch control mechanism for a motor vehicle clutch comprising a motor connected to the clutch, a follow-up control mechanism for energizing the motor to disengage the clutch and for progressively deenergizing the motor to release the clutch elements for movement into operative engagement, said control mechanism having a manually movable element and a follow-up element, and further comprising a spring device having a predetermined loading for controlling the movement of said follow-up element to control the movement of the clutch elements into operative engagement with relation to operation of said manually operable element, a lever connected to said spring device, a pair of means connected to said lever and selectively operable for differently loading said spring device to effect different relative lagging movements of the clutch elements into operative engagement, and means for effecting simultaneous operation of said pair of means to still differently load said spring device to effect a still different relative lagging of the movement of the clutch elements into operative engagement.

19. A clutch control mechanism for a motor vehicle clutch, comprising a motor connected to the clutch, a control mechanism for energizing the motor to disengage the clutch and for progressively deenergizing the motor to release the clutch elements for movement into operative engagement, and an auxiliary control means comprising a pair of solenoids each having an armature, and a common device engageable by both armatures to utilize movement of either armature for affecting said control mechanism, said auxiliary control means being constructed and arranged to differently affect said control mechanism upon energization of the respective solenoids to provide different relative lagging of the movement of the clutch elements into operative engagement.

20. A clutch control mechanism for a motor vehicle clutch, comprising a motor connected to the clutch, a control mechanism for energizing the motor to disengage the clutch and for progressively deenergizing the motor to release the clutch elements for movement into operative engagement, and an auxiliary control means comprising a pair of solenoids each having an armature, and a common device engageable by both armatures to utilize movement of either armature for affecting said control mechanism, said auxiliary control means being constructed and arranged to differently affect said control mechanism upon energization of the respective solenoids to provide different relative lagging of the movement of the clutch elements into operative engagement, said auxiliary control means being constructed and arranged whereby simultaneous energization of said solenoids provides a still different relative lagging of the movement of the clutch elements into operative engagement.

21. A clutch control mechanism for a motor vehicle clutch, comprising a fluid pressure motor connected to the clutch, a follow-up control valve mechanism for controlling pressures in said motor, said valve mechanism comprising a manually operable element, a follow-up element, and a spring tending to move said follow-up element in a motor-deenergizing direction with respect to said manually operable element, a lever having mechanical connection with said spring, and a pair of selectively operable devices connected to said lever to move the latter different distances to differently load said spring to change the follow-up action of said follow-up element and thus change the relative movement of the clutch elements into operative engagement with respect to a clutch-releasing movement of said manually operable element.

22. A clutch control mechanism for a motor vehicle clutch, comprising a fluid pressure motor connected to the clutch, a follow-up control valve mechanism for controlling pressures in said motor, said valve mechanism comprising a manually operable element, a follow-up element, and a spring tending to move said follow-up element in a motor-deenergizing direction with respect to said manually operable element, a lever having mechanical connection with said spring, and a pair of selectively operable devices connected to said lever to move the latter different distances to differently load said spring to change the follow-up action of said follow-up element and thus change the relative movement of the clutch elements into operative engagement with respect to a clutch-releasing movement of said manually operable element, said lever and said pair of means being constructed and arranged whereby simultaneous operation of said pair of means will still differently load said spring to still differently control the movement of the clutch elements into operative engagement relative to a clutch-releasing operation of said manually operable element.

23. A clutch control mechanism for a motor vehicle clutch, comprising a motor connected to the clutch, a control mechanism for energizing the motor to disengage the clutch elements and for progressively deenergizing the motor to release the clutch elements for movement into operative engagment, said control mechanism including a manually operable element, a spring connected to a portion of said control mechanism and cooperating therewith to determine the movement of the clutch elements into operative engagement with relation to the operation of said manually operable element, a lever having a portion mechanically connected to said spring to determine the loading thereof, said lever having means for predetermining its normal position to predetermine the normal loading of said spring, and a pair of solenoids each having an armature connected to said lever and selectively movable to provide different movements of said lever to differently change the loading of said spring whereby movement of the clutch elements toward operative engagement takes place in a different relationship to movement of said manually operable element.

24. A clutch control mechanism for a motor vehicle clutch, comprising a motor connected to the clutch, a control mechanism for energizing the motor to disengage the clutch elements and for progressively deenergizing the motor to release the clutch elements for movement into operative engagement, said control mechanism including a manually operable element, a spring connected to a portion of said control mechanism and cooperating therewith to determine the movement of the clutch elements into operative engagement with relation to the operation of said manually operable element, a lever having a portion mechanically connected to said spring to determine the loading thereof, said lever having means for predetermining its normal position to predetermine the normal loading of said spring, and a pair of solenoids each having an armature connected to said lever and selectively movable to provide different movements of said lever to differently change the loading of said spring whereby movement of the clutch elements toward operative engagement takes place in a different relationship to movement of said manually operable element, said lever and its connections to said armatures being constructed and arranged whereby simultaneous energization of said solenoids loads said spring to a still different extent to provide a still different movement of the clutch elements into operative engagement with relation to movement of said manually operable element.

25. In combination with a motor vehicle power plant including an engine having a throttle, and a clutch, an operating mechanism for the clutch, comprising a fluid pressure motor, a follow-up control valve mechanism for the motor including a valve element connected for operation with the throttle, and a follow-up valve, means for causing said follow-up valve to operate in a follow-up relation with respect to said first named valve whereby movement of the throttle to idling position energizes the motor to disengage the clutch and whereby opening movement of the throttle progressively releases the differential pressures in the motor to release the clutch elements for movement toward operative engagement, said means having a part for determining the normal relationship of the movement of the clutch elements toward operative engagement with respect to opening movement of the throttle, and a pair of devices selectively operable and constructed and arranged to cooperate with said part to cause a different movement of the clutch elements into operative engagement with relation to opening movement of the throttle.

26. In combination with a motor vehicle power plant including an engine having a throttle, and a clutch, an operating mechanism for the clutch, comprising a fluid pressure motor, a follow-up control valve mechanism for the motor including a valve element connected for operation with the throttle, and a follow-up valve, means for causing said follow-up valve to operate in a follow-up relation with respect to said first named valve whereby movement of the throttle to idling position energizes the motor to disengage the clutch and whereby opening movement of the throttle progressively releases the differential pressures in the motor to release the clutch elements for movement toward operative engagement, said means having a part for determining the normal relationship of the movement of the clutch elements toward operative engagement with respect to opening movement of the throttle, and a pair of devices selectively operable and constructed and arranged to cooperate with said part to cause a different movement of the clutch elements into operative engagement with relation to opening movement of the throttle, said pair of means being constructed and arranged for simultaneous operation to affect said part to cause a still different movement of the clutch elements toward operative engagement with relation to the opening of the throttle.

27. In combination with a motor vehicle power plant including an engine having a throttle, and a clutch, an operating mechanism for the clutch, comprising a fluid pressure motor, a follow-up control valve mechanism for the motor including a valve element connected for operation with the throttle, and a follow-up valve, means for causing said follow-up valve to operate in a follow-up relation with respect to said first named valve whereby movement of the throttle to idling position energizes the motor to disengage the clutch and whereby opening movement of the throttle progressively releases the differential pressures in the motor to release the clutch elements for movement toward operative engagement, said means including a spring having a predetermined normal loading and connected to said follow-up valve to predetermine the movement of the clutch elements into operative engagement with relation to the opening movement of the throttle, a lever against which said spring seats, and a pair of devices engaging said lever and selectively operable to move it and differently increase the loading of said spring to differently affect the movement of the clutch elements into operative engagement with relation to opening movement of said throttle.

28. In combination with a motor vehicle power plant including an engine having a throttle, and a clutch, an operating mechanism for the clutch, comprising a fluid pressure motor, a follow-up control valve mechanism for the motor including a valve element connected for operation with the throttle, and a follow-up valve, means for causing said follow-up valve to operate in a follow-up relation with respect to said first named valve whereby movement of the throttle to idling position energizes the motor to disengage the clutch and whereby opening movement of the throttle progressively releases the differential pressures in the motor to release the clutch elements for movement toward operative engagement, said means including a spring having a predetermined normal loading and connected to said follow-up valve to predetermine the movement of the clutch elements into operative engagement with relation to the opening movement of the throttle, a lever against which said spring seats, and a pair of solenoids each having an armature connected to said lever and selectively operable for moving said lever to differently increase the loading of said spring to cause different relative movements of said clutch elements into operative engagement with respect to opening movement of the throttle.

29. In combination with a motor vehicle power plant including an engine having a throttle, and a clutch, an operating mechanism for the clutch, comprising a fluid pressure motor, a follow-up control valve mechanism for the motor including a valve element connected for operation with the throttle, and a follow-up valve, means for causing said follow-up valve to operate in a follow-up relation with respect to said first named valve whereby movement of the throttle to idling position energizes the motor to disengage the clutch and whereby opening movement of the throttle progressively releases the differential pressures in the motor to release the clutch elements for movement toward operative engagement, said means including a spring having a predetermined normal loading and connected to said follow-up valve to predetermine the movement of the clutch elements into operative engagement with relation to the opening movement of the throttle, a lever against which said spring seats, and a pair of solenoids each having an armature connected to said lever and selectively operable for moving said lever to differently increase the loading of said spring to cause different relative movements of said clutch elements into operative engagement with respect to opening movement of the throttle, said lever and said solenoids being constructed and arranged whereby simultaneous energization of said solenoids will increase the loading of said spring to a still different extent.

30. In combination with a motor vehicle power plant having an engine, a throttle, a clutch, and a transmission, a clutch operating mechanism comprising a motor connected to the clutch, a follow-up control mechanism for said motor constructed and arranged to be operated in conjunction with the throttle and said motor, a device constructed and arranged to provide for a normal rate of deenergization of the motor to control movement of the clutch elements into operative engagement in a given relationship to opening movement of the throttle, and a pair of mechanisms constructed and arranged to be selectively rendered operative under two different transmission conditions for differently controlling the functioning of said device to provide different relative movements of the clutch elements into operative engagement with respect to opening movement of the throttle.

31. In combination with a motor vehicle power plant having an engine, a throttle, a clutch, and a transmission, a clutch operating mechanism comprising a motor connected to the clutch, a follow-up control mechanism for said motor constructed and arranged to be operated in conjunction with the throttle and said motor, a device constructed and arranged to provide for a normal rate of deenergization of the motor to control movement of the clutch elements into operative engagement in a given relationship to opening movement of the throttle, a pair of mechanisms constructed and arranged to be selectively rendered operative under two different transmission conditions for differently controlling the functioning of said device to provide different relative movements of the clutch elements into operative engagement with respect to opening movement of the throttle, and means for rendering said pair of mechanisms simultaneously operable under different transmission conditions to still differently affect said device to cause a still different relative movement of the clutch elements into operative engagement with respect to the opening movement of the throttle.

32. In combination with a motor vehicle power plant having an engine, a throttle therefor, a clutch and a transmission, a clutch operating mechanism comprising a fluid pressure motor connected to the clutch, a follow-up valve mechanism comprising a pair of valve elements one connected for operation in conjunction with the throttle, means for causing the other valve element to partake of a follow-up action with respect to the first named element, said means including a spring tending to move said second named valve in a clutch-releasing direction, said spring having a predetermined loading to determine the normal movement of the clutch elements toward operative engagement with relation to movement of said first named valve upon opening movement of said throttle, and a pair of devices separately operable in accordance with transmission conditions for differently loading said spring.

33. In combination with a motor vehicle power plant having an engine, a throttle therefor, a clutch and a transmission, a clutch operating mechanism comprising a fluid pressure motor connected to the clutch, a follow-up valve mechanism comprising a pair of valve elements one connected for operation in conjunction with the throttle, means for causing the other valve element to partake of a follow-up action with respect to the first named element, said means including a spring tending to move said second named valve in a clutch-releasing direction, said spring having a predetermined loading to determine the normal movement of the clutch elements toward operative engagement with relation to movement of said first named valve upon opening movement of said throttle, and a pair of devices separately operable in accordance with transmission conditions for differently loading said spring, said pair of devices being constructed and arranged for simultaneous operation upon a different condition in the transmission for providing a still different loading of said spring.

34. In combination with an automobile having an engine, a throttle therefor, a clutch, a transmission and a gear shift lever therefor, a clutch operating mechanism comprising a differential pressure fluid motor, a follow-up control valve mechanism therefor comprising a pair of valves one of which is connected for operation with the throttle, means for causing the other valve to partake of a follow-up action with respect to the first named valve, said means including a spring the loading of which affects the deenergization of the motor and the movement of the clutch elements toward operative engagement with relation to the movement of said first named valve upon opening movement of the throttle, a pair of devices constructed and arranged for differently loading said spring, and a plurality of means for rendering said pair of devices variously operative, one of said plurality of means being connected and arranged for operation by said transmission under a predetermined condition and by said gear shift lever in a predetermined operation thereof.

35. In combination with an automobile having an engine, a throttle therefor, a clutch, a transmission and a gear shift lever therefor, a clutch operating mechanism comprising a differential pressure fluid motor, a follow-up control valve mechanism therefor comprising a pair of valves one of which is connected for operation with the throttle, means for causing the other valve to partake of a follow-up action with respect to the first named valve, said means including a spring the loading of which affects the deenergization of the motor and the movement of the clutch elements toward operative engagement with relation to the movement of said first named valve upon opening movement of the throttle, a pair of devices constructed and arranged for differently loading said spring, means for selectively operating said pair of devices under different predetermined conditions in the transmission to provide different loadings of said spring, and means for rendering both devices of said pair operative to provide a maximum loading of said spring under a predetermined condition in the transmission and upon a predetermined operation of the gear shift lever.

36. A control mechanism for the clutch of a motor vehicle engine having a throttle, comprising a motor connected to the clutch, a follow-up control mechanism for the motor operable to energize the motor to disengage the clutch when the throttle is in idling position, and to deenergize the motor upon opening movement of the throttle to release the clutch elements for controlled movement into operative engagement, said control mechanism being constructed and arranged to provide a normal relationship of the movement of the clutch elements toward operative engagement with respect to opening movement of the throttle, and a pair of devices selectively operable and constructed and arranged for altering the operation of said control mechanism whereby the latter causes different relationships in the movements of the clutch elements into operative engagement with respect to opening movements of the throttle.

37. A control mechanism for the clutch of a motor vehicle engine having a throttle, comprising a motor connected to the clutch, a follow-up control mechanism for the motor operable to energize the motor to disengage the clutch when the throttle is in idling position, and to deenergize the motor upon opening movement of the throttle to release the clutch elements for controlled movement into operative engagement, said control mechanism being constructed and arranged to provide a normal relationship of the movement of the clutch elements toward operative engagement with respect to opening movement of the throttle, and a pair of devices selectively operable and constructed and arranged for altering the operation of said control mechanism whereby the latter causes different relationships in the movements of the clutch elements into operative engagement with respect to opening movements of the throttle, said pair of devices being constructed and arranged for simultaneous operation to cause a still different relationship in the movement of the clutch elements into operative engagement with respect to opening movement of the throttle.

JEANNOT G. INGRES.